United States Patent
Hosaka

(10) Patent No.: US 11,761,126 B2
(45) Date of Patent: Sep. 19, 2023

(54) NON-COATED BASE FABRIC FOR AIRBAG, AIRBAG, AND MANUFACTURING METHOD OF NON-COATED BASE FABRIC FOR AIRBAG

(71) Applicant: Toray Industries, Inc., Tokyo (JP)

(72) Inventor: Taiki Hosaka, Osaka (JP)

(73) Assignee: Toray Industries, Inc., Tokyo (JP)

( * ) Notice: Subject to any disclaimer, the term of this patent is extended or adjusted under 35 U.S.C. 154(b) by 219 days.

(21) Appl. No.: 17/276,571

(22) PCT Filed: Aug. 27, 2019

(86) PCT No.: PCT/JP2019/033551
§ 371 (c)(1),
(2) Date: Mar. 16, 2021

(87) PCT Pub. No.: WO2020/059443
PCT Pub. Date: Mar. 26, 2020

(65) Prior Publication Data
US 2022/0049383 A1    Feb. 17, 2022

(30) Foreign Application Priority Data
Sep. 19, 2018 (JP) .................. 2018-174652

(51) Int. Cl.
| | |
|---|---|
| *D03D 1/02* | (2006.01) |
| *D03D 13/00* | (2006.01) |
| *D03D 15/283* | (2021.01) |
| *B60R 21/235* | (2006.01) |
| *D06C 7/02* | (2006.01) |

(52) U.S. Cl.
CPC ......... *D03D 15/283* (2021.01); *B60R 21/235* (2013.01); *D03D 1/02* (2013.01); *D03D 13/008* (2013.01); *D06C 7/02* (2013.01); *B60R 2021/23509* (2013.01); *D10B 2331/02* (2013.01); *D10B 2505/124* (2013.01)

(58) Field of Classification Search
CPC ...... D03D 15/283; D03D 1/02; D03D 13/008; B60R 21/235; B60R 2021/23509; D06C 7/02; D10B 2331/02; D10B 2505/124
See application file for complete search history.

(56) References Cited

U.S. PATENT DOCUMENTS

| | | | | |
|---|---|---|---|---|
| 6,536,481 | B2 * | 3/2003 | Wang | D03D 49/68 |
| | | | | 139/192 |
| 10,543,803 | B2 * | 1/2020 | Yokoi | D03D 15/37 |
| 2015/0336530 | A1 * | 11/2015 | Tanaka | D03D 1/02 |
| | | | | 28/165 |
| 2017/0067189 | A1 * | 3/2017 | Yokoi | D03D 15/46 |

FOREIGN PATENT DOCUMENTS

| | | | | |
|---|---|---|---|---|
| CN | 104278392 | A | | 1/2015 |
| CN | 204982224 | U * | 1/2016 | ............... D03D 1/02 |
| JP | H09-105047 | A | | 4/1997 |
| JP | H10-8344 | A | | 1/1998 |
| JP | 2008-081873 | A | | 4/2008 |
| JP | 2013-040415 | A | | 2/2013 |
| JP | 2014-181430 | A | | 9/2014 |

* cited by examiner

*Primary Examiner* — Robert H Muromoto, Jr.
(74) *Attorney, Agent, or Firm* — DLA Piper LLP (US)

(57) ABSTRACT

A non-coated base fabric for an airbag is made of a polyamide fiber, wherein a CV value of the dynamic air permeability by the ASTM D6476 method is 6.0% or less, a CV value of the air permeability at a differential pressure of 500 Pa by the ASTM D3886 method is 10.0% or less, and a CV value of the air permeability at a differential pressure of 20 KPa is 10.0% or less, which are measured every 20 cm in a weft direction of the base fabric.

5 Claims, No Drawings

NON-COATED BASE FABRIC FOR AIRBAG, AIRBAG, AND MANUFACTURING METHOD OF NON-COATED BASE FABRIC FOR AIRBAG

TECHNICAL FIELD

This disclosure relates to a non-coated base fabric for an airbag, an airbag, and a manufacturing method of the non-coated base fabric for an airbag. More specifically, the disclosure relates to a non-coated base fabric for an airbag having a uniform air permeability in a weft direction of the base fabric, an airbag in which the non-coated base fabric for an airbag is sewn, and a manufacturing method of the non-coated base fabric for an airbag.

BACKGROUND

In recent years, various airbags have been installed in vehicles to ensure safety of occupants in the event of a vehicle collision. Examples of various airbags include an airbag for driver protection, an airbag for passenger seat protection, an airbag for knee protection, an airbag for chest protection built into a seat, and an airbag for head protection mounted in a ceiling above a window, and the like. The airbags for driver protection and passenger seat protection, in which a non-coated base fabric is mainly used, are provided with vent holes that adjust the internal pressure of the airbag, which are intended to properly adjust and maintain the internal pressure. However, if the air permeability of the non-coated base fabric fluctuates, there is a concern that the internal pressure cannot be adjusted and maintained at a predetermined level by the vent holes. Therefore, the base fabric used for an airbag has been required to have a uniform air permeability.

Moreover, the airbag is imparted with a high-pressure air at a high speed when deployed. Therefore, the airbag has been required to have a uniform air permeability even in a form such that a base fabric form such as a dynamic air permeability and a high-pressure air permeability changes, in addition to the conventional air permeability under a low pressure and a constant pressure.

Furthermore, the airbag has been required to have a property of not bursting due to an impact or internal pressure of the bag (burst resistance) when deployed. Therefore, the base fabric needs to have a uniform mechanical property (tensile strength, tear strength and the like) to obtain an airbag having an excellent burst resistance.

As a method of obtaining uniform air permeability and mechanical property, for example, JP H10-8344 A proposes a base fabric made of polyester filament processed by a combined step of a roller setting step and a stenter setting step. Moreover, as a means of achieving uniform air permeability and flammability, JP H9-105047 A proposes a woven fabric finished through a roller shrinkage setting step. Furthermore, J P 2008-81873 A proposes a method of making a crimp ratio uniform by keeping the warp yarn tension at the time of weaving constant in a width direction to obtain a uniform air permeability.

The technique disclosed in JP '344 is expensive since the roller setting step and the stenter setting step are used in combination. Moreover, since the technique disclosed in JP '047 changes the surface state of the fabric to make the air permeability uniform, a uniform air permeability cannot be achieved in an air permeability form that changes the surface state of the base fabric such as a high-pressure air permeability and a dynamic air permeability. Furthermore, the technique disclosed in JP '344 does not mention uniformity of mechanical strength. In addition, the technique disclosed in JP '047 is a shrink process through a roller setting step. Therefore, the technique disclosed in JP '047 does not have a sufficient mechanical strength uniformity in a width direction. Also, the technique disclosed in JP '047 cannot achieve a uniform air permeability in an air permeability form that changes the surface state of the base fabric such as a high-pressure air permeability and a dynamic air permeability. Additionally, the technique disclosed in JP '873 is a technique relating to a base fabric woven at a high density and cannot be applied to a base fabric woven at a low density. Furthermore, JP '873 does not mention uniformity of mechanical strength.

It could therefore be helpful to provide a non-coated base fabric for an airbag that is excellent in a uniform air permeability and a uniform mechanical property, an airbag in which the non-coated base fabric for an airbag is sewn, and a manufacturing method of the non-coated base fabric for an airbag.

SUMMARY

I thus provide:

A non-coated base fabric for an airbag is made of a polyamide fiber, wherein CV values of the air permeability of (A) to (C) measured every 20 cm in a weft direction of the base fabric satisfy:

(A) A CV value of the dynamic air permeability by the ASTM D6476 method is 6.0% or less,
(B) A CV value of the air permeability at a differential pressure of 500 Pa by the ASTM D3886 method is 10.0% or less, and
(C) A CV value of the air permeability at a differential pressure of 20 KPa according to JIS L 1096 is 10.0% or less.

A method of manufacturing a non-coated base fabric for an airbag is a method of manufacturing the above-described non-coated base fabric for an airbag, the method comprising a heat setting step and a step of adjusting the surface temperature of the base fabric before the heat setting step, wherein, after adjusting the surface temperature of the base fabric to 40 to 70° C., the heat setting step is performed.

An airbag comprises a sewn non-coated base fabric.

DETAILED DESCRIPTION

Non-Coated Base Fabric for an Airbag

The non-coated base fabric for an airbag according to one example also referred to as a base fabric) is a woven fabric in which a polyamide fiber is woven. Moreover, in the base fabric, the CV values of the air permeability of (A) to (C) measured every 20 cm in the weft direction of the base fabric satisfy:

(A) The CV value of the dynamic air permeability by the ASTM D6476 method is 6.0% or less,
(B) The CV value of the air permeability at the differential pressure of 500 Pa by the ASTM D3886 method is 10.0% or less, and
(C) The CV value of the air permeability at the differential pressure of 20 KPa according to JIS L 1096 is 10.0% or less.

Woven Fabric in which a Polyamide Fiber is Woven

Examples of the polyamide fiber include fibers or the like made of nylon 6, nylon 6,6, nylon 12, nylon 46, a copolymerized polyamide of nylon 6 and nylon 6,6, and a copolymerized polyamide in which polyalkylene glycol, dicarboxylic acid, amine and the like are copolymerized with nylon 6 and the like. The polyamide fiber is preferably a fiber made of nylon 6 or nylon 6,6 from the viewpoint of an excellent impact resistance of an airbag to be obtained.

The total fineness of the polyamide fiber is not particularly limited. By way of an example, the total fineness of the polyamide fiber is preferably 235 dtex or more, and more preferably 280 dtex or more. Moreover, the total fineness of the polyamide fiber is preferably 940 dtex or less, and more preferably 700 dtex or less. When the total fineness of the polyamide fiber is within the above-described ranges, an airbag to be obtained can easily obtain a necessary mechanical property (tensile strength, tear strength and the like). Furthermore, a base fabric to be obtained has excellent lightness and compactness. The total fineness of the polyamide fiber can be calculated based on the JIS L1013 (1999) 8.3.1 A method.

In addition, the single fiber fineness of the polyamide fiber is not particularly limited. By way of example, the single fiber fineness of the polyamide fiber is preferably 1 dtex or more, more preferably 1.5 dtex or more, and further preferably 2 dtex or more. Moreover, the single fiber fineness of the polyamide fiber is preferably 8 dtex or less, and more preferably 7 dtex or less. When the single fiber fineness of the polyamide fiber is 1 dtex or more, a single fiber breakage during manufacturing is easily suppressed, and the polyamide fiber is easily manufactured. Furthermore, when the single fiber fineness of the polyamide fiber is 8 dtex or less, flexibility of warp and weft yarn to be obtained improve. Besides, the single fiber fineness of the polyamide fiber can be calculated by dividing the total fineness by the number of filaments. Additionally, the number of filaments can be calculated based on the JIS L1013 (1999) 8.4 method.

A cross-sectional shape of the single fiber of the polyamide fiber is not particularly limited. By way of an example, the cross-sectional shape of the single fiber may be circular, various non-circular such as Y-shaped, V-shaped, and flat-shaped, and have a hollow portion. Among them, the cross-sectional shape of the single fiber is preferably circular from the viewpoint of yarn-forming property.

Referring back to the general description of the entire polyamide fiber, the tenacity of the polyamide fiber is preferably 8.0 cN/dtex or more, and more preferably 8.4 cN/dtex or more. When the tenacity of the polyamide fiber is within the above-described ranges, a base fabric to be obtained can easily obtain a sufficient mechanical property (tensile strength, tear strength and the like). An upper limit of the tenacity is not particularly limited. The tenacity of the polyamide fiber can be calculated by measurement under the conditions of constant rate of elongation shown in the JIS L1013 (1999) 8.5.1 standard time test.

The elongation of the polyamide fiber is preferably 20% or more, and more preferably 21% or more. The elongation of the polyamide fiber is preferably 25% or less, and more preferably 24% or less. When the elongation of the polyamide fiber is within the above-described ranges, a woven fabric to be obtained is excellent in toughness and breaking workload. Moreover, the polyamide fiber having the elongation within the above-described ranges can improve in yarn-forming property and weaving property. The elongation of the polyamide fiber can be calculated based on an elongation of a point showing the maximum strength in the S-S curve line obtained when calculating the tenacity.

The polyamide fiber may be appropriately compounded with additives such as heat stabilizers, antioxidants, light stabilizers, smoothing agents, antistatic agents, plasticizers, thickeners, pigments, and flame retardants to improve productivity in a spinning step, a stretching step, and a processing step, or property of a woven fabric to be obtained.

Referring back to the general description of the base fabric, the base fabric has a CV value of 6.0% or less of the dynamic air permeability by the ASTM D6476 method measured every 20 cm in the weft direction of the base fabric, a CV value of 10.0% or less of the air permeability at the differential pressure of 500 Pa by the ASTM D3886 method, and a CV value of 10.0% or less of the air permeability at the differential pressure of 20 KPa. When the base fabric has a CV value that exceeds each of the above-described CV values in each air permeability, the internal pressure performance may fluctuate depending on a cutting position of the base fabric used for an airbag. In addition, the base fabric has a high uniformity in the above-described three types of air permeability. When any of the air permeability is not uniform, the internal pressure performance may fluctuate depending on a size of an airbag cushion, a type of an inflator, a difference in acceleration of an occupant or the like. The CV values can usually be calculated by measurement in a whole width direction of the base fabric. When the width of the base fabric is small, it may be sufficient that there are at least 5 measurement points.

The dynamic air permeability of the base fabric according to the ASTM D6476 method is preferably 700 mm/s or less, and more preferably 600 mm/s or less. When the dynamic air permeability is within the above-described ranges, an internal pressure performance required for an airbag can be easily obtained.

The air permeability of the base fabric at the differential pressure of 500 Pa according to the ASTM D3886 method is preferably 3.0 L/dm$^2$/min or less, and more preferably 2.5 L/dm$^2$/min or less. When the air permeability at the differential pressure of 500 Pa is within the above-described ranges, an internal pressure performance required for an airbag can be easily obtained.

The air permeability of the base fabric at the differential pressure of 20 KPa according to the JIS L 1096 (1999) is preferably 1.5 L/cm$^2$/min or less, and more preferably 1.2 L/cm$^2$/min or less. When the air permeability at the differential pressure of 20 KPa is within the above-described ranges, an internal pressure performance required for an airbag can be easily obtained.

The base fabric preferably has a CV value of 1.5% or less of tensile strength and a CV value of 3.0% or less of tear strength measured every 20 cm in the weft direction of the base fabric. When the base fabric satisfies the above-described CV value of each strength, an occupant restraint performance is less likely to fluctuate depending on a cutting position of the base fabric used for an airbag. The tensile strength is a tensile strength according to the JIS K 6404-3 (1999), and the tear strength is a tear strength according to the JIS K 6404-4 (1999).

The tensile strength of the base fabric is preferably 600 N/cm or more, more preferably 625 N/cm or more, and further preferably 650 N/cm or more, in both warp and weft directions. An upper limit of the tensile strength is not particularly limited. When the tensile strength is within the above-described ranges, an airbag to be obtained can easily obtain a mechanical strength required at the time of deployment.

The tear strength of the base fabric is preferably 100 N or more, and more preferably 125 N or more, in both warp and weft directions. An upper limit of the tear strength is not particularly limited. When the tear strength is within the above-described ranges, an airbag to be obtained can easily obtain a mechanical strength required at the time of deployment.

The basis weight of the base fabric is preferably 220 g/m² or less, and more preferably 215 g/m² or less. When the basis weight of the base fabric is within the above-described ranges, an airbag to be obtained does not become too heavy and is suitable. A weight reduction of the base fabric is directly linked to a fuel efficiency of an automobile. Therefore, the lower the lower limit of the basis weight is, the better it is. On the other hand, the lower limit of the basis weight is preferably 150 g/m² or more from the viewpoint of a required heat-resistant capacity. The basis weight can be calculated based on the JIS L 1096 (1999) 8.4.2.

The base fabric preferably has a thickness of 0.35 mm or less, and more preferably 0.33 mm or less. When the thickness of the base fabric is within the above-described ranges, an occupant space can be easily secured in a vehicle mounted with an airbag. In addition, a degree of freedom in design inside the vehicle can be easily increased. When the thickness exceeds 0.35 mm, the compactness of the base fabric tends to decrease.

Airbag

My airbag is an airbag in which the base fabric of the above-described example (the non-coated base fabric for an airbag) is sewn. The airbag can be manufactured by a conventionally known method. That is, the airbag is manufactured, for example, by sewing a base fabric into a bag shape and mounting an accessory device such as an inflator to it.

As described in detail in the above-described example, the base fabric constituting the airbag is excellent in uniformity of air permeability, tensile strength, and tear strength in the weft direction of the base fabric. Therefore, the airbag can obtain uniform internal pressure-holding performance and occupant restraint performance regardless of a cutting position of the base fabric. Thus, the airbag is useful as an airbag for driver protection, an airbag for passenger seat protection, an airbag for knee protection, an airbag for chest protection built into a seat, an airbag for head protection mounted in a ceiling above a window, and the like.

Manufacturing Method of Non-Coated Base Fabric for an Airbag

The method of manufacturing the non-coated base fabric for an airbag ("the method of manufacturing a base fabric") is a method of manufacturing the base fabric of the above-described example (the non-coated base fabric for an airbag). The manufacturing method of the base fabric includes a heat setting step and a step of adjusting the surface temperature of the base fabric before the heat setting step (a preheating step). The preheating step is a step of adjusting the surface temperature of the base fabric to 40 to 70° C. Besides, all of the other steps shown below are illustrative and may be appropriately replaced with other known steps.

First, the above-described warp yarn is warped in relation to the base fabric and installed on a loom. Similarly, the weft yarn is installed on the loom. The loom is not particularly limited. Examples of the loom include a water jet room, an air jet room, a rapier room, and the like. Among them, a water jet room is preferable as the loom from the viewpoints of a relatively easy high-speed weaving and an easily increased productivity. The warp yarn and weft yarn are both preferably the same type of polyamide fiber. The warp yarn and weft yarn are both preferably woven to have the same weaving density. "The same type of polyamide fiber" means a fiber having the equivalent polymer type, total fineness, and physical property. "The same weaving density" means that a difference in weaving density between the warp yarn and weft yarn after weaving is within 1.5 yarns. The weaving density can be calculated based on the JIS L 1096 (1999) 8.6.1.

The weaving condition is not particularly limited. By way of an example, weaving is preferably performed by adjusting the warp tension to 60 to 100 cN/yarns. When the warp tension is within the above-described range, the tensioned warp yarn becomes flat in shooting the weft yarn, and the air permeability can be controlled to be low. When the warp tension is 60 cN/yarns or more, a force with which the warp yarn restrains the weft yarn is appropriate, and a predetermined density is easily achieved. Moreover, when the warp tension is 100 cN/yarns or less, a low air permeability can be obtained, and fluffing or the like due to abrasion is unlikely to occur on the warp yarn, and the excellent productivity can be easily maintained.

The method of adjusting the warp tension is not particularly limited. By way of an example, the warp tension can be adjusted by a method of adjusting a warp feeding speed of a loom, a method of adjusting a weft shooting speed or the like. Whether the warp tension is within the above-described ranges or not can be confirmed, for example, by measuring a tension applied to each warp yarn with a tension measuring instrument in a warp beam and a central portion of a back roller during operation of a loom.

In the manufacturing method of the base fabric, an opening timing in weaving is preferably 330 degrees or more. Moreover, the opening timing is preferably 0 degree (360 degrees) or less, and more preferably 340 degrees or less. When the opening timing is within the above-described ranges, a weft tension in weaving becomes uniform, and a uniform tensile strength can be easily obtained. When the opening timing is 330 degrees or more, the weft tension becomes uniform, and the tensile strength is less likely to fluctuate. On the other hand, when the opening timing is 0 degree or less, a weft yarn is sufficiently restrained and has an excellent weaving property. The "opening timing" represents that each timing is expressed between 0 and 360 degrees as one reciprocating movement of a reed (one rotation of a loom) being 360 degrees. The timing of 0 degree (360 degrees) means a timing when the reed moves to the frontmost on the weaving side.

After completion of weaving, the obtained woven fabric is scoured as necessary. In the scouring step, the woven fabric is placed in, for example, a plurality of tanks and washed with water. At that time, a scouring agent (for example, a nonionic surfactant or an anionic surfactant) is appropriately compounded. The water temperature of each tank is preferably about 40 to 70° C. Thereby, the scouring agent is activated, and an oil agent, wax or the like adhering to weaving yarn can be efficiently removed.

The obtained woven fabric is subjected to a preheating step before heat setting. In the preheating step before heat setting, the surface temperature of the base fabric is adjusted to 40 to 70° C., and more preferably 42 to 69° C. Moreover, a CV value of the surface temperature in a weft direction of the base fabric is preferably 0.04% or less. When the temperature of the base fabric before heat setting is within the above-described ranges, the base fabric structure in the weft direction of the base fabric becomes uniform, and thus the air permeability and the mechanical strength can be made more uniform. The preheating step before the heat setting step is not particularly limited. The preheating step can be performed with a hot air dryer, a suction drum dryer, a non-touch dryer or the like.

Described here is a fluctuation in physical property in a weft direction. The fluctuation in physical property in the weft direction of the base fabric is derived from a fluctuation in a base fabric structure, and the fluctuation in the base fabric structure is affected by flatness, tension state, restraint state, crimp rate and the like of a fiber constituting the base fabric. In general, these factors that determine the base fabric structure can be changed by performing a heat setting process in a state of exceeding the glass transition point of the fiber. From this technical background, I found that a uniform air permeability can be obtained by a method such as a method of extending the heat setting time or a method of raising the heat setting temperature even in the conventional processing steps. However, according to such a conventional method, a uniform strength in a width direction cannot be obtained due to an excessive heat shrinkage, and an excessive heat setting causes a fiber to shrink, and consequently a predetermined air permeability cannot be obtained. In view of such a situation, as a result of repeating various tests, I found that the base fabric can be imparted with more uniform air permeability property and mechanical property by further performing a preheating step before the heat setting step.

After the preheating step before heat setting, the base fabric whose surface temperature has been adjusted may be subjected to a heat setting process. The heat setting temperature is not particularly specified. By way of an example, the heat setting temperature is preferably 120 to 200° C., and the heat setting time is preferably about 30 to 40 seconds. Moreover, a tension in a warp direction during heat setting is preferably 0.1 to 0.5 kg/cm, and a tension in a weft direction during heat setting is preferably 0.1 to 0.3 kg/cm. The equipment used in the heat setting step is not particularly limited. By way of an example, the equipment used in the heat setting step is a pin stenter, a clip stenter or the like that can control shrinkage of the base fabric in a width direction.

The base fabric obtained as described above is excellent in uniformity of air permeability and mechanical strength in the weft direction of the base fabric. Therefore, the base fabric is particularly useful as a base fabric for an airbag since it can achieve uniform internal pressure property and occupant restraint performance regardless of a cutting position.

One example has been described above. This disclosure is not particularly limited to the above-described example. Besides, the above-described example mainly explains a fabric having the following configurations:

(1) A non-coated base fabric for an airbag made of a polyamide fiber, wherein CV values of air permeability of (A) to (C) measured every 20 cm in a weft direction of the base fabric satisfy the following requirements:

(A) A CV value of the dynamic air permeability by the ASTM D6476 method is 6.0% or less, (B) A CV value of the air permeability at a differential pressure of 500 Pa by the ASTM D3886 method is 10.0% or less, and (C) A CV value of the air permeability at a differential pressure of 20 KPa according to JIS L 1096 is 10.0% or less.

(2) The non-coated base fabric for an airbag of (1), wherein a CV value of tensile strength measured every 20 cm in a weft direction of the base fabric is 1.5% or less, and a CV value of tear strength is 3.0% or less.

(3) A method of manufacturing the non-coated base fabric for an airbag of (1) or (2), the method comprising a heat setting step and a step of adjusting the surface temperature of the base fabric before the heat setting step, wherein, after adjusting the surface temperature of the base fabric to 40 to 70° C., the heat setting step is performed.

(4) An airbag in which the non-coated base fabric for an airbag of any one of (1) to (3) is sewn.

EXAMPLES

Hereinafter, my fabrics, methods and airbags will be described in more detail with reference to Examples. This disclosure is not limited to the Examples. In the following Examples, each characteristic value was calculated by the following methods.

Calculation Method of Characteristic Value

Total Fineness

Total fineness was calculated by measuring a fineness based on corrected weight with a predetermined load of 0.045 cN/dtex by the JIS L1013 (1999) 8.3.1 A method.

Number of Filaments

The number of filaments was calculated based on the JIS L1013 (1999) 8.4 method.

Single Fiber Fineness

Single fiber fineness was calculated by dividing the total fineness by the number of filaments.

Tensile Strength and Elongation of Filament

Tensile strength and elongation were calculated by measurement under the conditions of constant rate of elongation shown in the JIS L1013 (1999) 8.5.1 standard time test. At that time, using "TENSILON" UCT-100 manufactured by ORIENTEC CORPORATION, a length of specimen between grips was set to be 25 cm, and a tension speed was set to be 30 cm/min. The elongation was calculated based on an elongation of a point showing the maximum strength in the S-S curve line.

Weaving Density

Each weaving density of warp yarn and weft yarn was calculated based on the JIS L 1096 (1999) 8.6.1. Specifically, a sample was placed on a flat table and cleared of unnatural wrinkles and tension, and the number of warp yarn and weft yarn with an interval of 2.54 cm was counted every 20 cm from one end of the base fabric to calculate an average value of each weaving density. Besides, a CV value was calculated by dividing the standard deviation of the data collected every 20 cm as described above by the average value and multiplying by 100.

Basis Weight

Basis weight was calculated by collecting 20 cm×20 cm test pieces every 20 cm from one end of the base fabric, measuring a mass (g) of each test piece, and converting the average value to a mass per 1 $m^2$ (g/$m^2$), based on the JIS L 1096 (1999) 8.4.2. A CV value was calculated by dividing the standard deviation of the data collected every 20 cm as described above by the average value and multiplying by 100.

Thickness

The thickness was measured after waiting for 10 seconds to settle the thickness under a pressure of 1.0 kPa using a thickness measuring machine with a circular probe having a diameter of 1.05 cm every 20 cm from one end of the base fabric, based on the JIS L1096 (1999) 8.5 A method. A CV value was calculated by dividing the standard deviation of the data collected every 20 cm as described above by the average value and multiplying by 100.

Surface Temperature of Base Fabric

The surface temperature of the base fabric was measured at 5 points in a weft direction of the base fabric five times using a radiation thermometer manufactured by Fluke Corporation to calculate the average value.

Example 1

Preparation of Yarn

As warp yarn and weft yarn, non-twisted synthetic fiber filaments were prepared which are made of nylon 6,6, have a circular cross-sectional shape, are composed of 72 single fiber filaments having a single fiber fineness of 6.52 dtex, have a total fineness of 470 dtex, have a tenacity of 8.4 cN/dtex, and have an elongation of 23.5%.

Weaving

The above-described yarns were used as warp yarn and weft yarn and woven into a woven fabric having a width of 200 cm with a weaving density of 54 yarns/2.54 cm in both warp yarn and weft yarn in a water jet room. At that time, the warp tension was adjusted to 94 cN/yarn, the opening timing was set to be 340 degrees, and the loom rotation speed was set to be 600 rpm.

Scouring and Heat Setting

Next, the obtained woven fabric was appropriately scoured and dried by a conventional method under the conditions shown in Table 1. Then, the base fabric whose surface temperature was maintained at 42° C. with a hot air dryer was subjected to a heat setting process at 180° C. for 1 minute under the dimensional regulations of a reduction in width of 0% and an overfeed rate of 0% using a pin stenter dryer.

Example 2

Preparation of Yarn

As warp yarn and weft yarn, the similar synthetic fiber filament as in Example 1 was prepared.

Weaving

Next, weaving was performed by the similar method as in Example 1.

Scouring and Heat Setting

Next, the obtained woven fabric was appropriately scoured and dried by the similar method as in Example 1 under the conditions shown in Table 1. Then, the base fabric whose surface temperature was maintained at 65° C. with a hot air dryer was subjected to a heat setting process by the similar method as in Example 1.

Comparative Example 1

Preparation of Yarn

As warp yarn and weft yarn, the similar synthetic fiber filament as in Example 1 was prepared.

Weaving

Next, weaving was performed by the similar method as in Example 1.

Scouring and Heat Setting

Next, the obtained woven fabric was appropriately scoured and dried by the similar method as in Example 1 under the conditions shown in Table 1. Then, without performing a preheating process with a hot air dryer, the base fabric was subjected to a heat setting process by the similar method as in Example 1. The surface temperature of the base fabric without performing the preheating process was 23° C.

Example 3

Preparation of Yarn

As warp yarn and weft yarn, non-twisted synthetic fiber filaments were prepared which are made of nylon 6,6, have a circular cross-sectional shape, are composed of 136 single fiber filaments having a single fiber fineness of 2.57 dtex, have a total fineness of 350 dtex, have a tenacity of 8.4 cN/dtex, and have an elongation of 23.5%.

Weaving

The above-described yarns were used as warp yarn and weft yarn and woven into a woven fabric having a width of 200 cm with a weaving density of 60 yarns/2.54 cm in both warp yarn and weft yarn in a water jet room. At that time, the warp tension was adjusted to 70 cN/yarn, the opening timing was set to be 340 degrees, and the loom rotation speed was set to be 600 rpm.

Scouring and Heat Setting

Next, the obtained woven fabric was appropriately scoured and dried by a conventional method under the conditions shown in Table 1. Then, the base fabric whose surface temperature was maintained at 44° C. with a hot air dryer was subjected to a heat setting process at 160° C. for 1 minute under the dimensional regulations of a reduction in width of 0% and an overfeed rate of 0% using a pin stenter dryer.

Example 4

Preparation of Yarn

As warp yarn and weft yarn, the similar synthetic fiber filament as in Example 3 was prepared.

Weaving

Next, weaving was performed by the similar method as in Example 3.

Scouring and Heat Setting

Next, the obtained woven fabric was appropriately scoured and dried by the similar method as in Example 3 under the conditions shown in Table 1. Then, the base fabric whose surface temperature was maintained at 69° C. with a hot air dryer was subjected to a heat setting process by the similar method as in Example 1.

Comparative Example 2

Preparation of Yarn

As warp yarn and weft yarn, the similar synthetic fiber filament as in Example 3 was prepared.

Weaving

Next, weaving was performed by the similar method as in Example 3.

Scouring and Heat Setting

Next, the obtained woven fabric was appropriately scoured and dried by the similar method as in Example 3 under the conditions shown in Table 1. Then, without performing a preheating process with a hot air dryer, the base fabric was subjected to a heat setting process by the similar method as in Example 3. The surface temperature of the base fabric without performing the preheating process was 24° C.

Example 5

Preparation of Yarn

As warp yarn and weft yarn, non-twisted synthetic fiber filaments were prepared which are made of nylon 6,6, have a circular cross-sectional shape, are composed of 136 single fiber filaments having a single fiber fineness of 3.46 dtex, have a total fineness of 470 dtex, have a tenacity of 8.4 cN/dtex, and have an elongation of 23.5%.

Weaving

The above-described yarns were used as warp yarn and weft yarn and woven into a woven fabric having a width of 200 cm with a weaving density of 53 yarns/2.54 cm in both warp yarn and weft yarn in a water jet room. At that time, the warp tension was adjusted to 100 cN/yarn, the opening timing was set to be 340 degrees, and the loom rotation speed was set to be 600 rpm.

Scouring and Heat Setting

Next, the obtained woven fabric was appropriately scoured and dried by a conventional method under the conditions shown in Table 1. Then, the base fabric whose surface temperature was maintained at 44° C. with a hot air dryer was subjected to a heat setting process at 160° C. for 1 minute under the dimensional regulations of a reduction in width of 0% and an overfeed rate of 0% using a pin stenter dryer.

Comparative Example 3

Preparation of Yarn

As warp yarn and weft yarn, the similar synthetic fiber filament as in Example 5 was prepared.

Weaving

Next, weaving was performed by the similar method as in Example 5.

Scouring and Heat Setting

Next, the obtained woven fabric was appropriately scoured and dried by the similar method as in Example 5 under the conditions shown in Table 1. Then, without performing a preheating process with a hot air dryer, the base fabric was subjected to a heat setting process by the similar method as in Example 5. The surface temperature of the base fabric without performing the preheating process was 24° C.

Example 6

Preparation of Yarn

As warp yarn and weft yarn, non-twisted synthetic fiber filaments were prepared which are made of nylon 6,6, have a circular cross-sectional shape, are composed of 136 single fiber filaments having a single fiber fineness of 3.46 dtex, have a total fineness of 470 dtex, have a tenacity of 8.4 cN/dtex, and have an elongation of 23.5%.

Weaving

The above-described yarns were used as warp yarn and weft yarn and woven into a woven fabric having a width of 200 cm with a weaving density of 50 yarns/2.54 cm in both warp yarn and weft yarn in a water jet room. At that time, the warp tension was adjusted to 90 cN/yarn, the opening timing was set to be 340 degrees, and the loom rotation speed was set to be 600 rpm.

Scouring and Heat Setting

Next, the obtained woven fabric was appropriately scoured and dried by a conventional method under the conditions shown in Table 1. Then, the base fabric whose surface temperature was maintained at 43° C. with a hot air dryer was subjected to a heat setting process at 160° C. for 1 minute under the dimensional regulations of a reduction in width of 0% and an overfeed rate of 0% using a pin stenter dryer.

Comparative Example 4

Preparation of Yarn

As warp yarn and weft yarn, the similar synthetic fiber filament as in Example 6 was prepared.

Weaving

Next, weaving was performed by the similar method as in Example 6.

Scouring and Heat Setting

Next, the obtained woven fabric was appropriately scoured and dried by the similar method as in Example 6 under the conditions shown in Table 1. Then, without performing a preheating process with a hot air dryer, the base fabric was subjected to a heat setting process by the similar method as in Example 6. The surface temperature of the base fabric without performing the preheating process was 24° C.

For each of the base fabrics obtained in Examples 1 to 6 and Comparative Examples 1 to 4, tensile strength, tear strength, dynamic air permeability, air permeability at the differential pressure of 500 Pa, and air permeability at the differential pressure of 20 KPa were evaluated by the following evaluation methods. The results are shown in Table 1.

Evaluation Methods

Tensile Strength of Base Fabric

Tensile strength was calculated by collecting test pieces in each of a warp direction and a weft direction every 20 cm from one end of the base fabric, removing yarn from both sides of the width into a width of 30 mm, and pulling the test pieces until they were cut at a gripping interval of 150 mm and a tension speed of 200 mm/min to measure a maximum load until the cutting with a constant speed tension type tester, and an average value in each of the warp direction and the weft direction was calculated, based on the JIS K 6404-3 (1999) 6. test method B (strip method). The CV value was calculated by dividing a standard deviation of the data collected every 20 cm by the average value and multiplying by 100.

Tear Strength of Base Fabric

Tear strength was measured by collecting test pieces having a long side of 200 mm and a short side of 76 mm every 20 cm from one end of the base fabric in both a warp direction and a weft direction, making a 75 mm notch at a right angle to a direction of the short side in a center of the short side of the test piece, and tearing the test pieces until they were cut at a gripping interval of 75 mm and a tension speed of 200 mm/min with a constant speed tension type tester to measure tear loads at that time, based on the JIS K 6404-4 (1999) 6. test method B (single tongue method). Three points of the measurements were selected in descending order from the maximum point excluding the first peak, from a chart recording line of the obtained tear loads, and the average value was calculated. Finally, an average value in each of the warp direction and the weft direction was calculated. The CV value was calculated by dividing a standard deviation of the data collected every 20 cm by the average value and multiplying by 100.

Dynamic Air Permeability

Dynamic air permeability was measured every 20 cm in a weft direction from one end of the base fabric using FX3350 manufactured by TEXTEST AG based on the ASTM D6476 method. A measurement tank of 400 cm$^3$ was used. The CV value was calculated by dividing a standard deviation of the data collected every 20 cm by the average value and multiplying by 100.

Air Permeability at Differential Pressure of 500 Pa

Air permeability at the differential pressure of 500 Pa was measured every 20 cm in the weft direction from one end of the base fabric using FX3300 manufactured by TEXTEST AG based on the ASTM D3886 method. A set value for the difference in pressure of the device was 500 Pa, and a measurement area was 100 cm². The CV value was calculated by dividing a standard deviation of the data collected every 20 cm by the average value and multiplying by 100.

Air Permeability at Differential Pressure of 20 KPa

Air permeability at the differential pressure of 20 KPa was measured every 20 cm in the weft direction from one end of the base fabric according to the JIS L 1096 (1999) 8.27.1A method. The base fabric was attached to one end of a cylinder with a diameter of 100 mm and fixed to it so that there is no air leakage therefrom, and the test differential pressure was adjusted to 20 KPa using a regulator to measure an amount of air passing through the base fabric at that time with a flowmeter. The CV value was calculated by dividing a standard deviation of the data collected every 20 cm by the average value and multiplying by 100.

TABLE 1

| | | Example 1 | Example 2 | Comparative Example 1 | Example 3 | Example 4 |
|---|---|---|---|---|---|---|
| Raw yarn used | | | | | | |
| Raw yarn fineness (dtex) | | 470 | 470 | 470 | 350 | 350 |
| Number of filaments (yarns) | | 72 | 72 | 72 | 136 | 136 |
| Processing conditions | | | | | | |
| Scouring temperature (° C.) | | 65 | 65 | 65 | 65 | 65 |
| Water washing temperature (° C.) | | 40 | 40 | 40 | 40 | 40 |
| Drying temperature (° C.) | | 120 | 120 | 120 | 120 | 120 |
| Surface temperature of base fabric before heat setting (° C.) | | 42 | 65 | 23 | 44 | 69 |
| Surface temperature of base fabric before heat setting CV value | | 0.036 | 0.034 | 0.147 | 0.030 | 0.026 |
| Heat setting temperature (° C.) | | 180 | 180 | 180 | 160 | 160 |
| Physical property of base fabric | | | | | | |
| Density (threads/in) | Warp | 54.5 | 54.5 | 54.5 | 59.7 | 59.7 |
| | Weft | 55.4 | 55.2 | 54.9 | 59.7 | 58.8 |
| Thickness (mm) | | 0.32 | 0.32 | 0.32 | 0.28 | 0.28 |
| Basis weight (g/m²) | | 214 | 214 | 214 | 181 | 179 |
| Tensile strength (N/cm) | Warp | 736 | 740 | 742 | 675 | 683 |
| | Weft | 796 | 790 | 798 | 676 | 680 |
| Tear strength (N) | Warp | 241 | 235 | 234 | 141 | 145 |
| | Weft | 250 | 255 | 248 | 147 | 150 |
| Dynamic air permeability (mm/sec) | | 576 | 580 | 574 | 383 | 361 |
| Air permeability at differential pressure of 500 Pa (L/dm²/min) | | 2.2 | 2.3 | 2.4 | 1.9 | 1.8 |
| Air permeability at differential pressure of 20 KPa (L/cm²/min) | | 0.99 | 1.00 | 0.98 | 0.72 | 0.70 |
| CV value (%) Standard deviation/average value*100 | | | | | | |
| Density (threads/in) | Warp | 0.3% | 0.3% | 0.4% | 0.2% | 0.2% |
| | Weft | 0.3% | 0.3% | 0.5% | 0.2% | 0.2% |
| Thickness (mm) | | 0.0% | 0.0% | 0.0% | 0.2% | 0.4% |
| Basis weight (g/m²) | | 0.3% | 0.3% | 0.4% | 0.4% | 0.1% |
| Tensile strength (N/cm) | Warp | 1.1% | 1.3% | 1.6% | 0.9% | 0.9% |
| | Weft | 0.9% | 1.0% | 1.6% | 0.7% | 0.9% |
| Tear strength (N) | Warp | 2.1% | 2.2% | 7.3% | 2.4% | 2.3% |
| | Weft | 1.8% | 1.8% | 7.8% | 2.1% | 2.1% |
| Dynamic air permeability(mm/sec) | | 3.2% | 3.1% | 6.3% | 4.0% | 4.9% |
| Air permeability at differential pressure of 500 Pa (L/dm²/min) | | 6.0% | 5.3% | 10.1% | 6.7% | 7.7% |
| Air permeability at differential pressure of 20 KPa (L/cm²/min) | | 5.0% | 5.9% | 10.5% | 5.6% | 4.4% |

| | | Comparative Example 2 | Example 5 | Comparative Example 3 | Example 6 | Comparative Example 4 |
|---|---|---|---|---|---|---|
| Raw yarn used | | | | | | |
| Raw yarn fineness (dtex) | | 350 | 470 | 470 | 470 | 470 |
| Number of filaments (yarns) | | 136 | 136 | 136 | 136 | 136 |
| Processing conditions | | | | | | |
| Scouring temperature (° C.) | | 65 | 65 | 65 | 65 | 65 |
| Water washing temperature (° C.) | | 40 | 40 | 40 | 40 | 40 |
| Drying temperature (° C.) | | 120 | 120 | 120 | 120 | 120 |
| Surface temperature of base fabric before heat setting (° C.) | | 24 | 44 | 24 | 43 | 24 |
| Surface temperature of base fabric before heat setting CV value | | 0.048 | 0.016 | 0.118 | 0.019 | 0.018 |
| Heat setting temperature (° C.) | | 160 | 160 | 160 | 160 | 160 |
| Physical property of base fabric | | | | | | |
| Density (threads/in) | Warp | 59.6 | 52.8 | 52.5 | 49.2 | 49.6 |
| | Weft | 59.6 | 52.5 | 53.3 | 50.7 | 50.5 |
| Thickness (mm) | | 0.29 | 0.33 | 0.33 | 0.30 | 0.30 |
| Basis weight (g/m²) | | 180 | 214 | 215 | 201 | 202 |
| Tensile strength (N/cm) | Warp | 665 | 754 | 735 | 729 | 718 |
| | Weft | 665 | 748 | 770 | 744 | 738 |

TABLE 1-continued

|  |  |  |  |  |  |  |
|---|---|---|---|---|---|---|
| Tear strength (N) | Warp | 140 | 174 | 161 | 186 | 183 |
|  | Weft | 135 | 184 | 178 | 184 | 184 |
| Dynamic air permeability (mm/sec) |  | 395 | 292 | 278 | 398 | 372 |
| Air permeability at differential pressure of 500 Pa (L/dm$^2$/min) |  | 2.0 | 1.2 | 1.8 | 2.2 | 1.9 |
| Air permeability at differential pressure of 20 KPa (L/cm$^2$/min) |  | 0.70 | 0.51 | 0.51 | 0.69 | 0.69 |
| CV value (%) Standard deviation/average value*100 |  |  |  |  |  |  |
| Density (threads/in) | Warp | 0.4% | 0.4% | 0.5% | 0.3% | 0.3% |
|  | Weft | 0.4% | 0.2% | 0.4% | 0.2% | 0.3% |
| Thickness (mm) |  | 1.2% | 2.2% | 2.4% | 2.0% | 2.7% |
| Basis weight (g/m$^2$) |  | 0.8% | 0.4% | 0.8% | 0.2% | 0.6% |
| Tensile strength (N/cm) | Warp | 1.9% | 1.0% | 2.2% | 0.9% | 1.8% |
|  | Weft | 1.9% | 1.1% | 2.0% | 0.8% | 1.7% |
| Tear strength (N) | Warp | 6.3% | 1.6% | 3.7% | 2.6% | 3.8% |
|  | Weft | 5.2% | 2.6v | 3.9% | 2.1% | 4.7% |
| Dynamic air permeability(mm/sec) |  | 11.3% | 5.9% | 9.6% | 4.5% | 6.3% |
| Air permeability at differential pressure of 500 Pa (L/dm$^2$/min) |  | 10.8% | 9.0% | 12.6% | 6.9% | 25.9% |
| Air permeability at differential pressure of 20 KPa (L/cm$^2$/min) |  | 12.7% | 9.8% | 15.5% | 7.1% | 10.5% |

As shown in Table 1, the base fabrics produced in Examples 1 to 6 were excellent in uniformity of air permeability in the weft direction of the base fabric and also in uniformity of tensile strength and tear strength.

On the other hand, the base fabrics produced in Comparative Examples 1 to 4 had large fluctuations in air permeability in the weft direction of the base fabric and mechanical strength. Therefore, that base fabric has a problem that internal pressure-holding performance and occupant restraint performance of the airbag may fluctuate depending on a position of the base fabric collected at the time of cutting.

The invention claimed is:

1. A non-coated base fabric for an airbag made of a polyamide fiber, wherein CV values of air permeability of (A) to (C) measured every 20 cm in a weft direction of the base fabric satisfy:
    (A) a CV value of dynamic air permeability by the ASTM D6476 method is 6.0% or less,
    (B) a CV value of air permeability at a differential pressure of 500 Pa by the ASTM D3886 method is 10.0% or less, and
    (C) a CV value of the air permeability at a differential pressure of 20 KPa according to JIS L 1096 is 10.0% or less wherein the non-coated base fabric is manufactured by a method comprising a heat setting step and a step of adjusting the surface temperature of the base fabric before the heat setting step.

2. The non-coated base fabric for an airbag of claim 1, wherein a CV value of tensile strength measured every 20 cm in a weft direction of the base fabric is 1.5% or less, and a CV value of tear strength is 3.0% or less.

3. A method of manufacturing the non-coated base fabric for an airbag of claim 1, the method comprising:
    a heat setting step and a step of adjusting the surface temperature of the base fabric before the heat setting step,
    wherein, after adjusting the surface temperature of the base fabric to 40 to 70° C., the heat setting step is performed.

4. An airbag in which the non-coated base fabric for an airbag of claim 1 is sewn.

5. The method of manufacturing the non-coated base fabric of claim 3, further comprising:
    a step of scouring and a step of drying a woven fabric before the step of adjusting the surface temperature of the base fabric and
    the heat setting step is performed after adjusting the surface temperature of the base fabric dried by a step of drying to 40 to 70° C.

* * * * *